L. G. NILSON.
CAR BODY CONSTRUCTION.
APPLICATION FILED JUNE 3, 1907.
923,292.
Patented June 1, 1909.
2 SHEETS—SHEET 2.
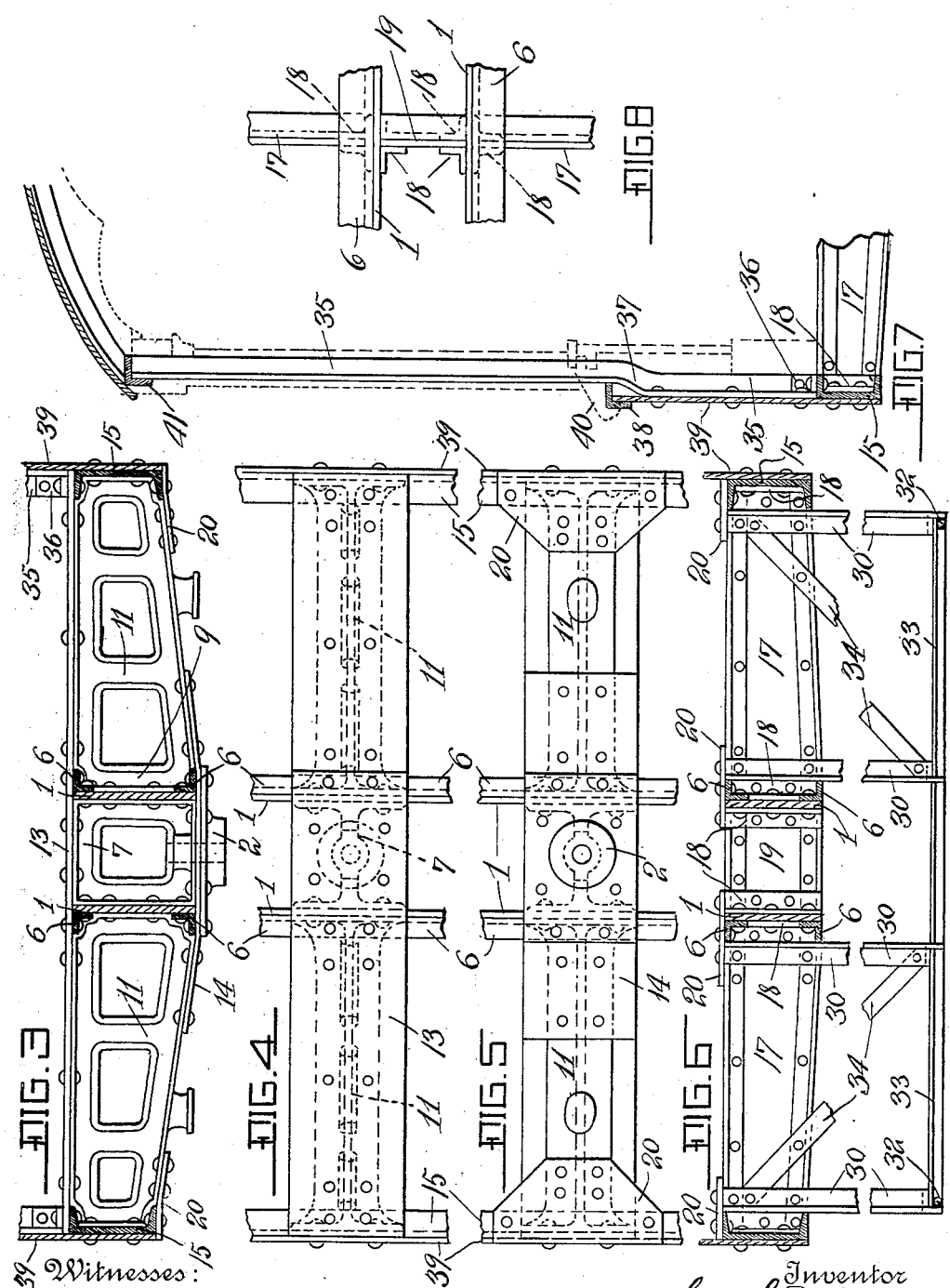
Witnesses:
Edmund O. Dubocq.
Geo. N. Kerr.
Inventor
Lars G. Nilson
By his Attorneys
Edwards, Sager & Wooster.

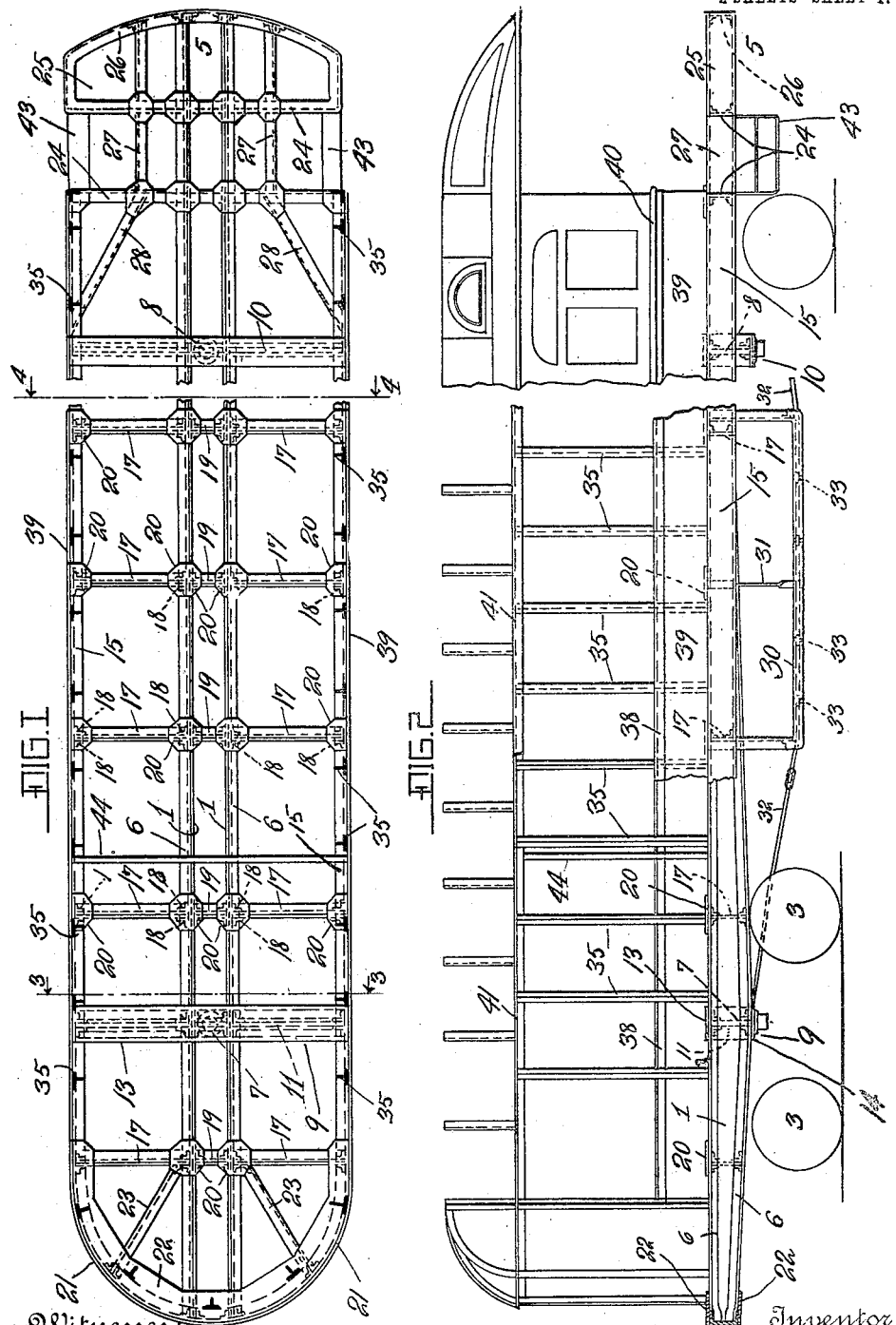

UNITED STATES PATENT OFFICE.

LARS G. NILSON, OF HOBOKEN, NEW JERSEY, ASSIGNOR OF ONE-HALF TO WILLIAM B. STRANG, OF NEW YORK, N. Y.

CAR-BODY CONSTRUCTION.

No. 923,292.   Specification of Letters Patent.   Patented June 1, 1909.

Application filed June 3, 1907. Serial No. 376,899.

*To all whom it may concern:*

Be it known that I, LARS G. NILSON, a citizen of the United States, residing at Hoboken, in the county of Hudson and State of New Jersey, have invented certain new and useful Improvements in Car-Body Construction, of which the following is a full, clear, and exact specification.

This invention relates to car body construction, and more particularly relates to railway cars having propelling machinery mounted on the car body.

The objects of the invention are to construct a car frame suitable for cars wherein a driving machine is carried by the underframe, which shall not be subject to vibration caused by the engine.

In ordinary railway cars supported at separated points by trucks there is a natural tendency toward vibration, the middle of the car having the greatest amplitude, but gradually diminishing toward the supports and then increasing from the supports outward to the ends. When an engine is mounted on the car frame, as in propelling systems embodying an engine connected to a generator which supplies motors on the trucks, the vibrations due to the engine may coincide at certain speeds with the natural vibrations of the underframe which increases the total vibration to an objectionable degree, and also is uncomfortable to the passengers. In such cars, the vibrations may prove very destructive to the frame and car body, and this invention therefore has for its object to construct an under frame and body for this class of cars, which shall be especially constructed to reduce the vibration, and at the same time be light in weight and strong enough to resist lateral, as well as compression strains.

In carrying out the invention, I have provided a car frame wherein the vibrations produced by the machinery and the natural vibrations due to the suspension of the frame neutralize each other. In the system of propulsion above referred to, there may be, in connection with the generator, a storage battery, and a further feature of the invention comprises a structure carried by the under frame for supporting the battery, while at the same time strengthening and stiffening the underframe.

In the embodiment of the invention herein described, the car frame comprises one or more center sills extending the length of the car body, and being of greatest rigidity or depth adjacent the end which is to carry the machinery. In combination therewith are oppositely disposed side sills connected by cross bracing and body bolsters, and carrying the flooring and side framing. The side framing comprises a series of uprights carried by the side sills and connected by deep plates extending from the bottom of the side sills to the belt rail, forming deep girders, above which the external covering and the windows will be carried.

In the accompanying drawings, Figure 1 is a plan view of a car underframe embodying the invention; Fig. 2 is a side view; Fig. 3 is a cross section on the line 3—3 of Fig. 1, showing the bolster construction; Fig. 4 is a plan view; Fig. 5 is a bottom view; Fig. 6 is a detail view showing the battery framing; Fig. 7 is an elevation of the side frame, and Fig. 8 is a detail view of the cross bracing.

Referring first to the center sills, of which there are preferably two extending the length of the car frame, each is made up of a longitudinal, vertically disposed plate 1, which is of greatest depth at the front bolster, and tapering therefrom toward the front end 4 and the rear end 5.

2 is a truck pivot, and 3, 3, are wheels carried by a motor truck, not shown.

Each of the sills 1 is stiffened by angles 6 riveted at top and bottom, preferably on the outer sides thereof. Between the plates 1 at the respective bolsters, are flanged spacing castings 7, 8, riveted thereto. The plates 1 could be flanged if desired, along one or both sides, instead of having the angles riveted thereto.

The front bolster, Figs. 3, 4 and 5, comprises the flanged castings 7, between the sills 1 and tapered castings 11 bolted thereto and to the side sills 15. 13 is a wide cross plate extending across on top between the outside sills 15 and bolted to the various parts. On the bottom is a plate 14, and a center plate carrying the truck pivot 2. The rear bolster is similarly constructed, though not so deep, as it does not carry the same load. The side sills 15 are shorter than the center sills, and are connected at intervals by cross braces 17 and angles 18, as in Fig. 8. The cross braces may be built up similarly to the sills 1, or be castings or punchings.

19 are spacers, similar to castings 7, 8. At the junctions are gusset plates 20, which, as will be seen from Fig. 5, are somewhat heavier for the bottom of the bolsters. At the front end are extensions 21 of the side sills curved around and attached to the center sills 1 by angles and rivets, and 22 is a flat stiffening plate or gusset secured on the top and bottom thereof.

23 are diagonal braces connecting the curved extensions 21 and the junction of the front cross piece with the center sills, so as to form a rigid structure capable of withstanding impact, and transmitting the same to the center sills.

The rear end construction comprises a cross brace 24 connecting the side sills and the center sills and the rear platform framing 25, is made up of a second cross brace 24, and curved rear end 26 connected by longitudinals 27, 27 near the center sill and inclined braces 28. These parts are all constructed of plates, angles and channels riveted together, wherever possible, so that the whole frame can be built up in this manner without requiring special shapes. The car frame has tension rods 32 extending from bolster to bolster in the usual manner, but a feature of this invention resides in a construction of cross bearers particularly adapted to carry the weight and contain the storage batteries, which are an important portion of the equipment of cars of this type. Secured preferably at the ends of two of the cross braces 17 near the middle, to the sills 1 and 15, are depending U-shaped frames 30, which may be composed of bent angles or channels. These are connected by cross bars 33 and diagonals 34, to form a stiff and rigid frame or cross bearer for transmitting the compression strains due to the tension rods to the sills, and also capable of supporting the battery. The tension rods 32 may be located in the angles 30, and will have turnbuckles, according to common practice. This construction of battery framing thus anchors the side and center sills together. The side framing consists of uprights 35 bolted to the tops of side sills 15 by angles 36, and the uprights 35 are curved inwardly at 37 in order to provide for the inturned angle stiffener 38, secured to the side plates 39, which latter are riveted to the side sills and to the uprights 35. This arrangement of cross bearers and battery box, in connection with the sills and side frames, anchors and stiffens the entire frame, forming a powerful plate girder either with or without the rods 32. The reason for bending inward the uprights 37 is to enable the top chord stiffener 38 to be applied in such manner as to support the belt rail 39 without increasing the width, and also to enable the upper part of the car body to be finished in wood if so desired. For this purpose, the belt rail 40 shown in Fig. 7 can come directly over the longitudinal stiffeners 38, and the window framing will come between the belt rail and the upper longitudinal stiffener 41 which connects the uprights 35. This outer finish may be of wood, which is somewhat cheaper than metal, and desirable for this reason, and also because this outside finish is not depended upon to stiffen the side frames. The stiff side plates need not be run much past the bolsters, as their main function is to carry the weight and stiffen the middle of the car, thus permitting the rest of the sides and the ends to be finished in lighter material. The car lines 42 forming the support for the roof are arched across as shown, between the longitudinals 41, forming the complete car body.

In Fig. 7, the dotted lines show the manner in which the wood finishings may be applied.

43 are steps at the rear, and 44 is a partition dividing off the engine room or cab.

Considering now the entire car frame construction, it will be seen that the center sills, upon which the larger part of the live load, due to the engines and generators, will be carried, will, by reason of the tapered construction, be heaviest at points of greatest load, and have a different period and amplitude of vibration than the side sills and side frames, which normally have the greatest amplitude of vibration at the middle. The effect will be that the vibrations from one set of sills will be neutralized and broken up by those from the other and the sides so that these two sets of vibrations will not be in harmony, but will be distributed in such a way as to be dissipated and dampened instead of magnified.

While in the foregoing description I have referred particularly to a motor driven unit carrying the machinery on the frame, and the construction is particularly adapted for reducing the vibrations caused thereby, it will be understood that the invention is not to be limited to such a form of car, inasmuch as the principle of providing two interconnected sills having different periods and amplitude of vibration whereby one will neutralize the other, may be applied to other cars. Furthermore, it will be understood that the particular constructions herein described, and the manner of building up the component parts may be varied in many particulars without departing from the scope of the invention, though it will be seen that the described construction can be built up from standard shapes, which is a considerable advantage in manufacture.

Having thus described my invention, I declare that what I claim as new and desire to secure by Letters Patent, is,—

1. In railway car construction, a longitudinal sill tapering in depth from an intermediate point to the opposite ends, a body bolster carried thereby at said intermediate point, and a second body bolster carried thereby between said point and the end of the sill.

2. In railway car construction, a longitudinal sill tapering in depth from an intermediate point to the opposite ends, and a plurality of body bolsters carried thereby between the ends, said body bolsters being of different heights.

3. In railway car construction, a longitudinal sill tapering in depth from an intermediate point to the opposite ends and a plurality of body bolsters carried thereby between the ends, one bolster being at said intermediate point of greatest depth.

4. In railway car construction, a longitudinal sill tapering in depth from an intermediate point nearer one end outwardly to the ends, a body bolster at the portion of greatest depth, and a second body bolster at a portion of less depth.

5. In railway car construction, a longitudinal sill tapering in depth from an intermediate point nearer one end outwardly to the ends, a body bolster at the point of greatest depth, a second body bolster at a point of less depth, and side sills of substantially uniform depth connecting the bolsters.

6. In railway car construction, a longitudinal sill tapering in depth from an intermediate point to the opposite ends, a plurality of transverse body bolsters carried thereby between the ends, outside sills, and stiffened plate sides carried by said side sills.

7. In a railway car construction, a longitudinal sill tapering in depth from an intermediate point to the opposite ends, a plurality of transverse body bolsters carried thereby between the ends, outside sills, and plate sides carried by said side sills, and stiffening means comprising vertical uprights and a longitudinal angle along the top of said plate.

8. In railway car construction, a longitudinal sill tapering in depth from an intermediate portion to the opposite ends, a plurality of transverse body bolsters carried thereby between the ends, outside sills, plate sides carried by said side sills, and stiffening means comprising vertical uprights and a longitudinal angle along the top of said plate, said vertical uprights being turned inwardly to clear the inner edge of the longitudinal angle.

9. In railway car construction, a longitudinal sill tapering in depth from an intermediate portion to the opposite ends, a plurality of transverse body bolsters carried thereby between the ends, outside sills, plate sides carried by said side sills, stiffening means comprising vertical uprights, a longitudinal angle along the top of said plate, and a belt rail carried by said angle.

10. In railway car construction, a longitudinal sill tapering in depth from an intermediate portion to the opposite ends, a plurality of transverse bolsters carried thereby between the ends, outside sills, plate sides carried by said side sills, stiffening means comprising vertical uprights and a longitudinal angle along the top of said plate, said vertical uprights being turned inwardly to clear the inner edge of the longitudinal angle, and a belt rail carried by said angle outside said uprights.

11. A railway car having two bolsters and longitudinal sills of greater depth at one bolster than at the other, an engine at the heavier end, and a battery support framing depending from the sills between the bolsters.

In testimony whereof I affix my signature, in presence of two witnesses.

LARS G. NILSON.

Witnesses:
JULIAN S. WOOSTER,
GEO. A. HOFFMAN.